Aug. 16, 1932.                Z. C. BRADFORD                1,871,875
                                MOTOR CONTROL
                              Filed May 3, 1929

Inventor
Zerbe C Bradford
By Spencer, Hardman, & Fehr
His Attorneys

Patented Aug. 16, 1932

1,871,875

UNITED STATES PATENT OFFICE

ZERBE C. BRADFORD, OF DAYTON, OHIO, ASSIGNOR TO DELCO PRODUCTS CORPORATION, OF DAYTON, OHIO, A CORPORATION OF DELAWARE

MOTOR CONTROL

Application filed May 3, 1929. Serial No. 360,026.

This invention relates to a thermal control for an electric motor and in particular to a thermal unit responsive to heat radiated from the motor and to abnormally sustained overload currents or sustained abnormal currents in the motor.

An object of this invention is to open the motor circuit whenever abnormally sustained overload currents or sustained abnormal currents are carried by the motor. This is accomplished by providing a thermostat connected in series with the motor switch which will open the motor switch whenever the currents through the motor circuit become deleterious.

Another object of this invention is to open the motor circuit when excessive heat is radiated from the motor. By providing such a device, if the motor should develop a short circuit or if the motor should for some other reason get overheated, the motor circuit will be opened. This is accomplished by inserting a thermostat within the motor, which is responsive to a comparatively low temperature.

Another object of this invention is to open the motor circuit in a very short increment of time. This has been accomplished by providing a pilot circuit, which is provided with an electromagnet normally holding a switch closed when energized. The pilot circuit is provided with a pair of contacts, which may be opened by either one of the thermostats. When these contacts in the pilot circuit are opened, the electromagnet becomes de-energized, which permits the opening of the motor switch by means of a spring.

Another object of this invention is to provide a pair of contacts in the pilot circuit which may be opened either by the thermostat responsive to the heat radiated from the motor or by the thermostat responsive to the deleterious currents through the motor circuit.

Further objects and advantages of the present invention will be apparent from the following description, reference being had to the accompanying drawing, wherein a preferred form of the embodiment of the present invention is clearly shown.

Figure 1:
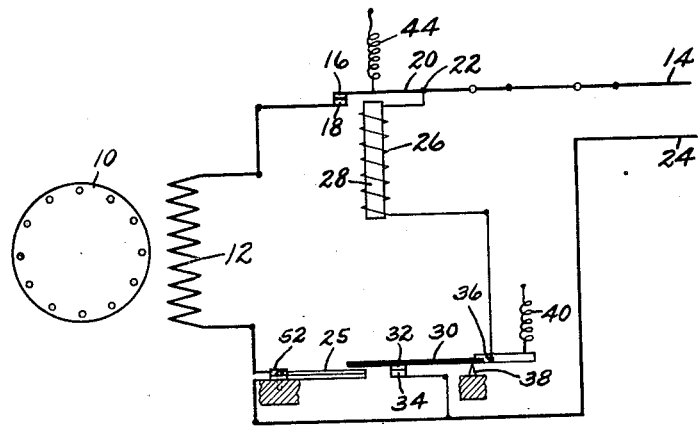
Fig. 1 is a schematic diagram of the circuit.

The circuit diagrams have been shown schematically, as these clearly disclose the invention.

In the drawing, the reference numeral 10 indicates a rotor of an induction motor having stator windings 12. Although an induction motor has been disclosed, the invention is not limited to the use with an induction motor as it may be used with any direct or alternating current motor or generator, or for that matter, the thermal unit may be used with other electric devices where there is danger of injury to the parts from excessive heat. The live wire 14 is connected to the stator windings 12 through a pair of contacts 16 and 18, one of which is mounted upon an armature 20, pivoted at 22. The other terminal of the stator windings 12 is connected to the other live wire 24.

Shunted across the live wires 14 and 24 is a pilot circuit having an electro-magnet 26 provided with an electromagnetic core 28, a thermostat 30, and a pair of contacts 32 and 34. This pilot circuit has a sufficiently high resistance so as to reduce the current through this circuit to a desired magnitude. The thermostat 30 is pivoted at 36 and normally rests upon the support 38. The contact 32 attached to the thermostat 30 is normally biased toward the contact 34 by means of a spring 40. The thermostat 30 is so constructed and arranged that it will open the contacts 32 and 34 when excessive heat is radiated from the motor. Preferably this thermostat is placed within the motor housing so that very little heat is necessary to actuate it. Whenever the thermostat 30 opens the contacts 32 and 34, the electromagnetic coil 26 will be deenergized which permits the spring 44 to actuate the armature 20 away from the electromagnetic core 28 so as to open the contacts 16 and 18 very rapidly thereby reducing the deleterious effects caused by transient currents due to the switching operation.

Figure 2:
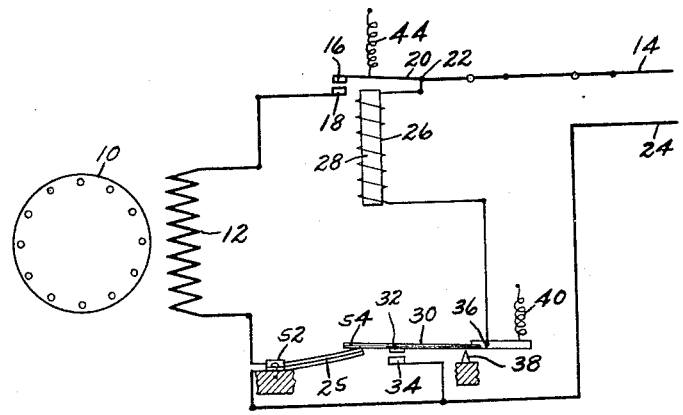
Fig. 2 shows a schematic diagram of the circuit immediately after the contacts in the pilot circuit have been opened by one of the thermostats.
Figure 3:
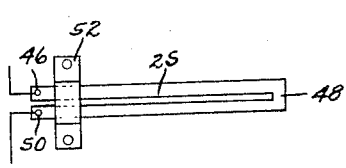
Fig. 3 is a detail view of one of the thermostats.

The thermostat 25, shown in detail in Fig. 3, has substantially a U-shaped form, the current entering at the point 46, flowing through one leg of the thermostat 25 to 48, then through the other leg to 50 so the path of the current through the thermostat is equal to more than twice the length of one of the legs. The thermostat 25 has both legs supported in a bracket or support 52. Whenever abnormally sustained normal load currents or sustained abnormal currents are carried by the motor circuit, the thermostat 25 will be heated which causes it to be deflected upwardly as disclosed in Fig. 2, so as to engage a portion 54 of the thermostat 30, so as to open the contacts 32 and 34, whereby the electromagnetic coil 26 will be deenergized permitting the spring 44 to open the contacts 16 and 18.

The thermostat 25 is preferably made from dissimilar metals or metal alloy which have a comparatively high resistance so that the cross section must be made large in order to carry the normal load current without generating sufficient heat to cause a deflection, which will open the contacts 32 and 34. This large cross section is very desirable for the reason that the strength of the thermostat, which has the form of a cantilever, must be sufficient to raise the weight of itself and raise the portion 54 of the thermostat 30 against the force of the spring 40.

As these thermostats are responsive to different sources of heat the two cannot be identical. If this were the case one could serve the purpose. For this reason the thermostat 30 is made from metals that will respond to a comparatively low temperature and the thermostat 25 is made from metals, having a high resistance, that will respond to only comparatively high temperatures.

When this arrangement of thermostats is used with the electric motor or generator carrying small currents, or for that matter is used in any other electrical devices carrying small currents the pilot circuit may be eliminated by inserting the contacts 32 and 34 actuated directly by either one of the thermostats in the main circuit. This may be done when there is no danger of injury to the contact points from arcing. For certain types of devices it may be desirable to have one thermostat actuate one pair of contacts and the other thermostat another pair of contacts. This being especially desirable if the thermostat responsive to the heat generated in the motor is mounted within the housing and the thermostat responsive to abnormally sustained overload currents or sustained abnormal currents in the motor circuit is mounted on the outside of the motor housing.

This arrangement for interrupting the motor circuit has the advantage over mechanical and electrical breakers, in that, when the motor has cooled sufficiently the circuit will again be closed without the aid of the operator.

While the form of embodiment of the present invention as herein disclosed, constitutes a preferred form, it is to be understood that other forms might be adopted, all coming within the scope of the claims which follow.

What is claimed is as follows:

1. A device for protecting an electric motor, comprising in combination, a main circuit through the motor; a pilot circuit shunted across the main circuit normally closed; an electromagnet in said pilot circuit for opening the main circuit upon being de-energized; means for opening the pilot circuit to thereby de-energize the electromagnet, said means including a thermostat responsive to heat radiated from the motor and a second thermostat physically engaging the first thermostat, said second thermostat being responsive to abnormally sustained overload currents or sustained abnormal currents in the motor so as to open the main circuit.

2. A control system for an electric device, said electric device having a main circuit comprising in combination a pilot circuit; a thermostat in said pilot circuit responsive to a temperature change for opening the pilot circuit when excessive heat is radiated by said device; a second thermostat actuating said first thermostat to open the pilot circuit, said second thermostat being responsive to abnormally sustained overload currents or sustained abnormal currents carried by said device; and means responsive to the opening of said pilot circuit for opening the main circuit so as to open-circuit the electric device until the said thermostats have cooled.

3. A control system for an electric device, said electric device having a main circuit comprising in combination a pilot circuit, a thermostat responsive to a temperature change for opening said pilot circuit when excessive heat is radiated by said device, said thermostat being pivotally mounted; and a second thermostat actuating said first thermostat about its pivot to open-circuit the pilot circuit, said second thermostat being responsive to abnormally sustained overload currents or sustained abnormal currents carried by said device, and means responsive to the opening or closing of the pilot circuit for opening or closing the main circuit so that as either thermostat is deflected the main circuit is opened or closed.

In testimony whereof I hereto affix my signature.

ZERBE C. BRADFORD.